United States Patent
Wu et al.

[11] Patent Number: 5,835,581
[45] Date of Patent: Nov. 10, 1998

[54] MULTI-FUNCTION TELEPHONE DIALER DISPLAY

[75] Inventors: Rong-Tyan Wu, Tai-Chung; Chern-Jsair Chang, Hsin-Chu, both of Taiwan

[73] Assignee: Holtek Microelectronics, Inc., Hsinchu, Taiwan

[21] Appl. No.: 717,496

[22] Filed: Sep. 20, 1996

[51] Int. Cl.⁶ .................................................. H04M 1/57
[52] U.S. Cl. .................. 379/142; 379/90.01; 379/93.01; 379/350; 379/352; 345/87
[58] Field of Search .......................... 379/96, 350, 352, 379/354, 355, 90, 93, 142, 90.01, 93.01, 93.05, 93.06, 93.17, 93.23; 345/87, 102

[56] References Cited

U.S. PATENT DOCUMENTS

| | | | |
|---|---|---|---|
| 4,709,387 | 11/1987 | Masuda | 379/354 |
| 4,779,083 | 10/1988 | Ishii et al. | 345/148 |
| 4,845,745 | 7/1989 | Havel | 379/354 |
| 4,924,496 | 5/1990 | Figa et al. | 379/142 |
| 5,216,710 | 6/1993 | Huang | 379/362 |
| 5,384,577 | 1/1995 | McLaughlin et al. | 345/102 |
| 5,452,346 | 9/1995 | Miyamoto | 379/142 |
| 5,481,594 | 1/1996 | Shen et al. | 379/67 |
| 5,500,893 | 3/1996 | Onosaka | 379/396 |
| 5,526,406 | 6/1996 | Luneau | 379/61 |
| 5,541,988 | 7/1996 | Draganoff | 379/354 |
| 5,554,912 | 9/1996 | Thayer et al. | 315/157 |

Primary Examiner—Krista Zele
Assistant Examiner—Timothy M. Morella
Attorney, Agent, or Firm—Tung & Associates

[57] ABSTRACT

A multi-function telephone dialer display device which is equipped with a display screen for displaying the use status and the caller identification information, and a dialer for responding to data input and for generating a data signal to the display screen to display the corresponding use status. When dialing with numerical keys, with standard non-numerical keys or when setting up a function, the data signal is coded into a numerical code representing the original digit, coded into a standard non-numerical code representing the original non-numerical keys or coded into a function key code representing the function, respectively. A display driver is electrically connected to the display screen, to the telephone dialer and to a caller data signal line for receiving and processing the data signals, the timing signals and the identification signal representing the caller information, and then transferring the result of the processing to the display screen for displaying a corresponding status and caller identification information.

12 Claims, 7 Drawing Sheets

| DATA SIGNAL | | | | DISPLAY ON DISPLAY SCREEN |
|---|---|---|---|---|
| SECONDARY CODE | | | TELEPHONE NUMBER OR STANDARD NON-NUMERICAL CODE OR FUNCTION KEY CODE | |
| DISPLAY CODE | | IDENTIFICATION CODE | | |
| FLASHING CONTROL | BRIGHTNESS CONTROL | | | |
| 1 BIT<br>0 ⇒ NOT FLASHING<br>1 ⇒ FLASHING | 2 BIT<br>00 ⇒ DIMEST<br>01 ⇒ DIM<br>10 ⇒ BRIGHT<br>11 ⇒ BRIGHTEST | 000<br>000<br>000<br>000<br>000<br>000<br>000<br>000<br>000<br>000 | 0001<br>0010<br>0011<br>0100<br>0101<br>0110<br>0111<br>1000<br>1001<br>1010 | 1<br>2<br>3<br>4<br>5<br>6<br>7<br>8<br>9<br>0 |
| 1 BIT<br>0 ⇒ NOT FLASHING<br>1 ⇒ FLASHING | 2 BIT<br>00 ⇒ DIMEST<br>01 ⇒ DIM<br>10 ⇒ BRIGHT<br>11 ⇒ BRIGHTEST | 001<br>001<br>001<br>001<br>001<br>001 | 0001<br>0010<br>0011<br>0100<br>0101<br>0110 | *<br>#<br>A<br>B<br>C<br>D |
| 1 BIT<br>0 ⇒ NOT FLASHING<br>1 ⇒ FLASHING | 2 BIT<br>00 ⇒ DIMEST<br>01 ⇒ DIM<br>10 ⇒ BRIGHT<br>11 ⇒ BRIGHTEST | 010<br>010<br>010<br>010<br>010<br>010<br>010<br>010 | 0000<br>0001<br>0010<br>0011<br>0100<br>0101<br>0110<br>0111 | P<br>ST<br>HD<br>HF<br>SA<br>F<br>MUTE<br>R |

MULTI-FUNCTION TELEPHONE DIALER DISPLAY

FIELD OF THE INVENTION

The present invention relates to a multi-function telephone dialer display and more particularly to a multi-function telephone dialer display device that is capable of displaying caller information.

BACKGROUND OF THE INVENTION

It is an objective in the development of telephone dialers to reduce the cost of a conventional telephone dialer display that consists of a microprocessor. In a conventional dialer, the display device does not provide the capability of caller identification display or other information display. This is a drawback for those users who wish to screen callers. To provide this capability, it is conventionally accomplished by adding a stand-alone device to the telephone. The component cost of such a CPU and a display device is very high. In addition, the stand-alone component increases the manufacturing and packaging costs. As a result, the final product can not be competitive in the market place.

Figure 1:
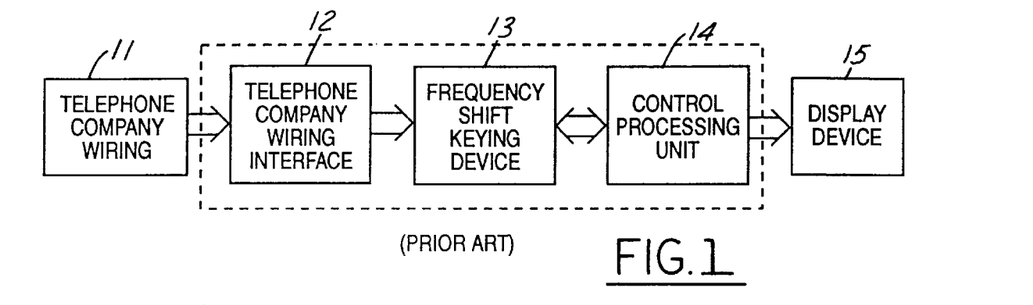
FIG. 1 is a block diagram of a conventional telephone display device that is equipped with the caller information detection function.
Figure 8:
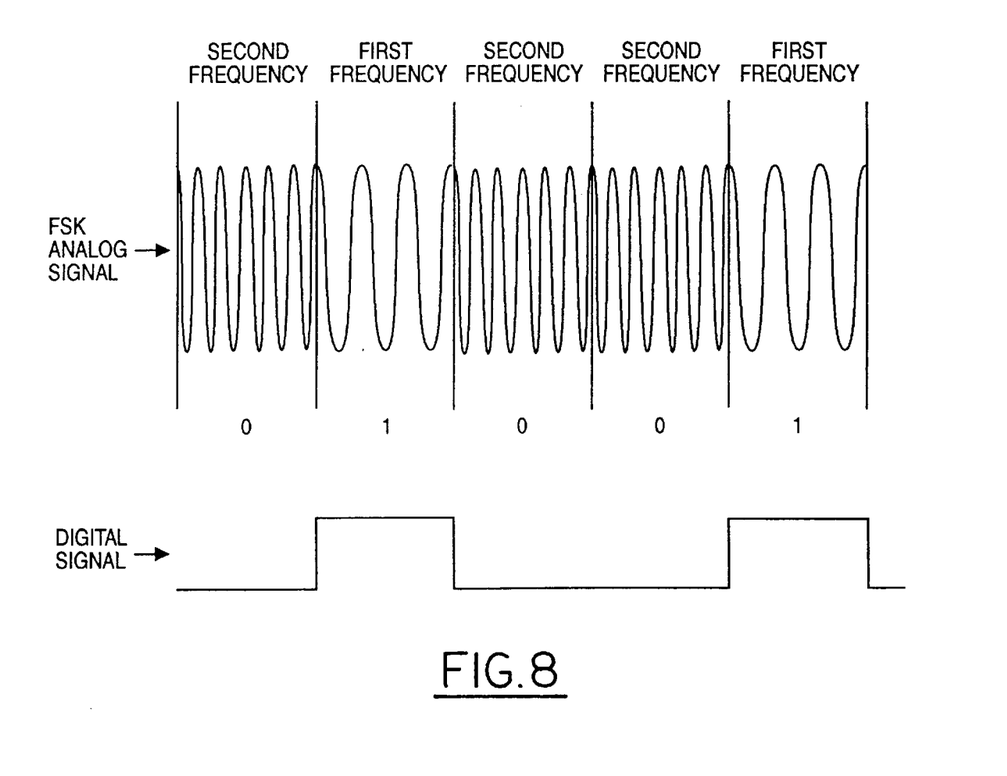
FIG. 8 shows a schematic diagram for the frequency shift keying method.

Referring initially to FIG. 1, where a block diagram of a conventional telephone display device that has the caller information detection function is shown. The telephone company wiring 11 transmits an identification signal which is a frequency shift keying (FSK) signal representing caller identification information to the wiring interface device 12, which then modulates the electric potential and the size of the alternating current signal, and filters out noises and unwanted signals to fit into the working range of a FSK device 13. After frequency shift keying (Referring to FIG. 8, the frequency shift keying uses the same amplitude analog signal but a different frequency for a digital signal, e.g., a 1200 Hz signal represents "1" and a 2200 Hz signal represents "0"), a digital signal is obtained and transmitted to a central processing unit (CPU) 14 which in turn decodes the digital signal and transmits to display device 15 for displaying. Due to the fact that the conventional device requires a separate CPU and a display device outside the telephone, the additional costs and the duplicating use of components can not be avoided.

It is therefore an object of the present invention to reduce the cost of a telephone dialer by sharing a display device and eliminating separate packaging efforts for the circuit used to display caller information.

SUMMARY OF THE INVENTION

The present invention discloses a multi-function telephone dialer display device which has a display screen for displaying the use status and the caller identification information, and a dialer to respond to data input from outside and to generate a data signal to the display screen to display the corresponding use status. The dialer is used to generate a data signal based on input data and to cause the display screen to show its corresponding use status. When dialing with numerical keys, the data signal is coded into a numerical code representing the original digit. When dialing with standard non-numerical keys, the data signal is coded into a standard non-numerical code representing the original non-numerical keys. When setting up a function, a data signal is first coded into a function key code representing the function; a display driver is then electrically connected to the display screen, the telephone dialer and the caller data signal line for receiving and processing data signals, timing signals and identification signals representing the caller information sent from the caller data signal line, and then transferring the result of processing to the display screen for displaying the corresponding use status and the caller identification information.

BRIEF DESCRIPTION OF THE DRAWINGS

Other objects, features and advantages of the present invention will become apparent upon consideration of the specification and the appended drawings in which.

DETAILED DESCRIPTION OF THE PREFERRED EMBODIMENTS

The present invention is related to a multi-function telephone dialer display which includes a display screen for displaying current use status and caller identification information, and a dialer for receiving data from outside and generating a data signal to the display screen displaying the corresponding use status. The dialer is used to generate a data signal based on the input data and to cause the display screen to show its corresponding use status. When dialing with numerical keys, the data signal is coded into a numerical code representing the original digit. When dialing with standard non-numerical keys, the data signal is coded into a standard non-numerical key code representing the original non-numerical key. When setting up a function, the data signal is coded into a function key code representing the function; a display driver is electrically connected to the display screen and the caller data signal line to receive and process the data signal, the timing signal and the identification signal representing the caller information received from the caller data signal line, and to transfer the results of the processing to the display screen for displaying the corresponding use status and the caller identification information.

In the present invention, the dialer has a detector which is connected to a telephone rotary dial, a telephone keypad or a telephone hook switch in order to receive and detect the input data from the telephone rotary dial, the keypad or the hook switch; a register which is electrically connected to the detector to store the input data; a coder to generate data signal by coding the input data; and a controller which is electrically connected to the detector, the register and the coder to respond to the input data from the detector and to control the actions of the register and the coder.

The display screen can be a liquid crystal display (LCD) device. In this case, the display driver in the multi-function telephone dialer display includes a dial receiver for receiving data signals from the telephone dialer; a decoder for receiving data signals from the telephone dialer and caller identification signals representing caller information transmitted via the caller data signal line and converted into the LCD required format; a multi-potential generator for generating various electrical potentials of different magnitudes and polarities; a driver which is electrically connected to the decoder and the multi-potential generator for combining the output of the decoder and the multi-potential generator and for generating signals to drive the LCD. The display driver also includes a controller which is electrically connected to the decoder, the multi-potential generator and the driver for controlling the operation of the driver.

When the display screen used is a LCD, the multi-function telephone dialer display further includes an inductor device for detecting the degree of brightness near the display and a display night light device which is electrically connected to the inductor device to emit light based on the degree of brightness near the display detected by the inductor device to obtain a desirable lighting effect.

The display screen may also be a light emitting diode (LED) display screen. In this case, the display driver in the multi-function telephone dialer display device preferably includes a dial receiver for receiving data signals from a telephone dialer; a decoder for receiving data signals from the telephone dialer and caller identification signals representing caller information and transmitted via the caller data signal line and converted into the LED required format; and a driver which is electrically connected to the decoder for generating signals to drive the LED display screen based on the output of the decoder. The display driver also includes a controller which is electrically connected to the decoder, the multi-potential generator and the driver for controlling the operation of the driver.

Another embodiment of the present invention telephone dialer includes a detector which is connected to a telephone rotary dial or a telephone keypad for receiving information and detecting input data from the telephone rotary dial or the keypad; a register which is electrically connected to the detector for storing the input data; a coder for generating data signal by coding the input data; a controller that is electrically connected to the detector, the register and the decoder to respond to the detected input data from the detector and to control the actions of the register and the decoder. When the display screen is a LCD device, the display driver preferably includes a dial receiver for receiving data signals from the telephone dialer; a decoder for receiving data signals from the telephone dialer, and caller identification signals representing caller information transmitted via the caller data signal line and converted into the LCD required format; a dial detector for receiving data signals from the telephone hook switch; a multi-potential generator for generating various electrical potentials of different magnitudes and polarities required for driving the LCD; a driver which is electrically connected to the decoder and the multi-potential generator for combining the output of the decoder and the multi-potential generator and for generating signals to drive the LCD; and a controller that is electrically connected to the decoder, the multi-potential generator and the driver for controlling its operation.

The multi-function telephone dialer display further includes an inductor device for detecting the degree of brightness near the display; and a display night light device which is electrically connected to the induction device for emitting lights based on the degree of brightness near the display detected by the inductor device to obtain a desirable lighting effect.

More preferably, the multi-function telephone dialer display device may include a brightness control device which is electrically connected to the induction device and the display night light device for controlling the brightness of the display night light device based on the degree of brightness near the display detected by the induction device.

The multi-function telephone dialer display device can use the wiring from the telephone company as the caller data signal wire, and the caller information identification signal can be a FSK signal.

The decoder in the multi-function telephone dialer display device may include a first decoder for receiving data signals from the dial receiver and converting them into the display screen required format; and a second decoder for receiving the FSK signals representing the caller information transmitted through the telephone company wire and converted into the display screen required format.

The second decoder in the multi-function telephone dialer display device may include a FSK device which is electrically connected to the telephone company wiring for obtaining a digital signal through FSK; and a digital coder unit which is electrically connected to the frequency shift keying device for decoding a digital signal into the required display screen format.

The second decoder in the multi-function telephone dialer display device further includes a wiring interface device that is electrically connected to the telephone company wiring and the FSK device for modulating the electric potential and the alternating current signal, and for filtering out noises and other unwanted signals so that they are within the working range of the FSK device.

The identification signal of the caller information which is transmitted through the signal line and inputted to the decoder of the multi-function telephone dialer display is a digital signal (i.e., a FSK signal) representing caller information transmitted through the telephone company wiring from which the electric potential, the alternating current signal are modulated and the noises and other unwanted signals are filtered out by a wiring interface device before outputting to a FSK device.

Figure 2:
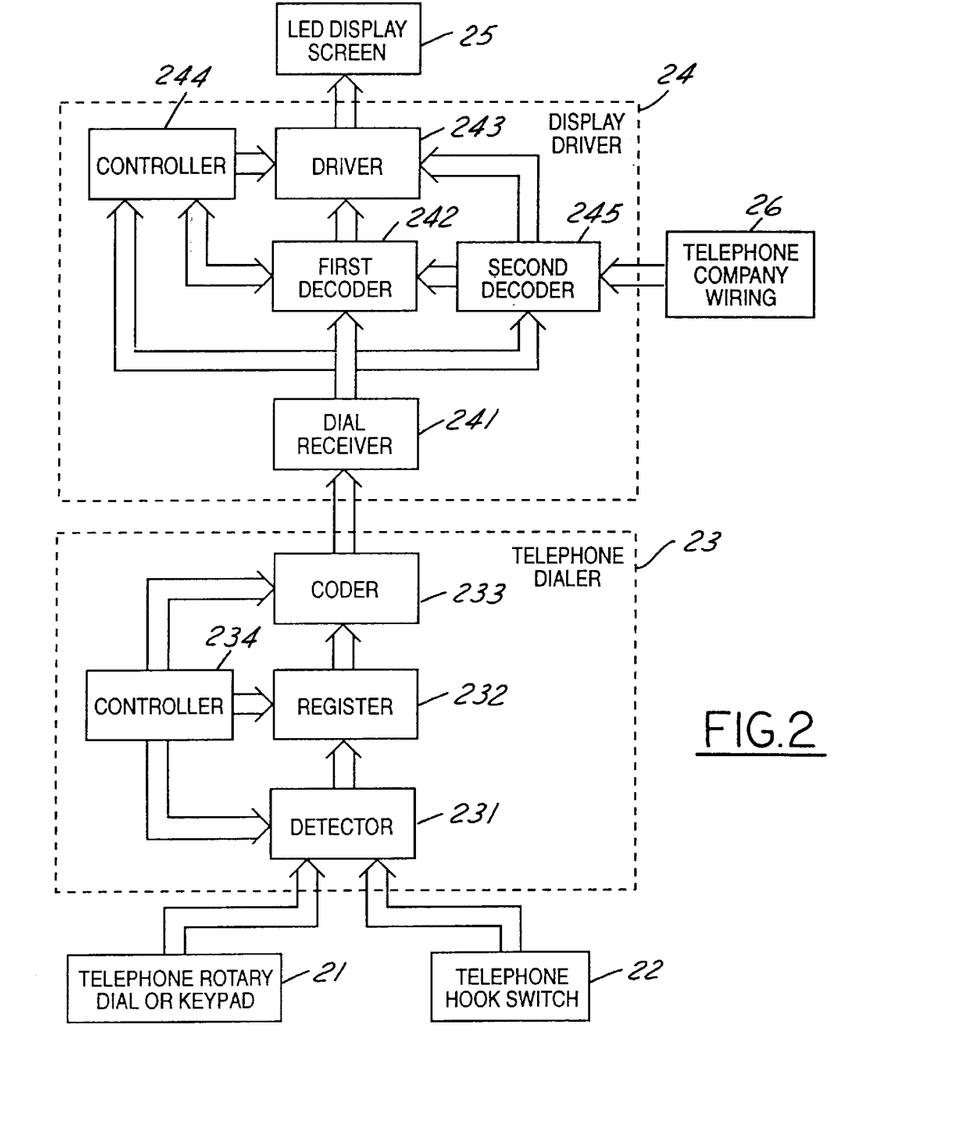
FIG. 2 is a block diagram of the preferred embodiment of the present invention multi-function telephone dialer display device.

Referring initially to FIG. 2 where a preferred embodiment of the present invention utilizing a LED display screen is shown. In this embodiment, the multi-function telephone dialer display device includes a dialer 23, a display driver 24 and a LED display screen 25. The dialer 23 includes a detector 231 which is connected to a rotary dial, a keypad 21 or a hook switch 22 for receiving and detecting input data from the rotary dial, the keypad 21 or the hook switch 22; a register 232 which is electrically connected to the detector 231 for storing the input data; a controller 234 which is electrically connected to the detector 231, the register 232 and a coder 233, and responds to the input data from detector 231 and controls the operations of the register 232 and coder 233. The display driver 24 includes a dial receiver 241 for receiving data signal from the telephone dialer 23; a first decoder 242 for receiving data signals from the dial receiver 241 and then converting to the required format of the LED 25, a second decoder 245 for receiving an identification signal transmitted through telephone company wiring 26

(which is a FSK signal modulated by a FSK method, the signal represents caller identification data and is converted to the LED display screen 25 required format), and a driver 243 which is electrically connected to the first decoder 242 and the second decoder 245. Based on the output of the two decoders, signals are generated to drive the LED display screen 25. A controller 244 which is electrically connected to the first decoder 242, the second decoder 245 and driver 243 controls their actions. The following is a detailed description of the characteristics of the present invention device for detecting the caller information and ID.

Figure 7:
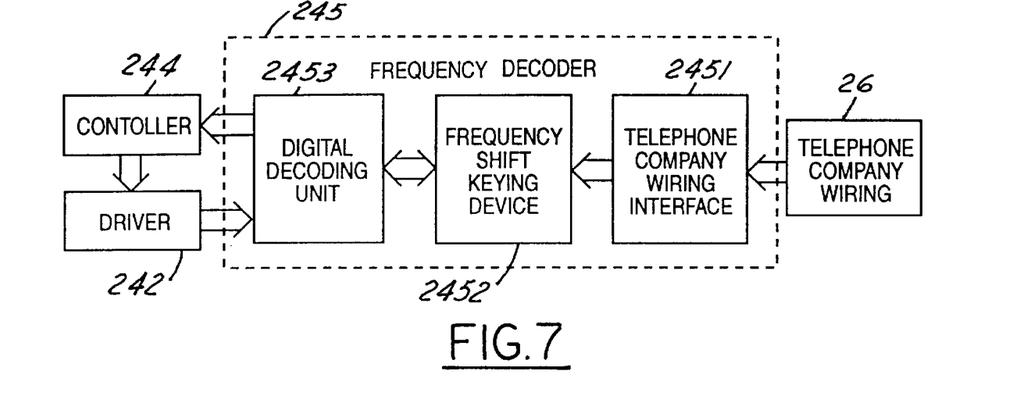
FIG. 7 is a block diagram for the second decoder in the present invention multi-function telephone dialer display device.

Referring now to FIG. 7. The second decoder 245 includes three major components, namely the wiring interface device 2451, the FSK device 2452 and the digital decoder unit 2453. When a caller makes a call, the telephone company wiring transmits FSK signals that represent the caller identification data (the data transmission protocol can be placed in two categories: 1. On-hook transmission transports data during the interval between ringing signals when the telephone is hung-up. 2. Off-hook transmission transports data during normal telephone conversation. Refer to Bell 202 or CCITT V.23 for regulation. The following description uses on-hook transmission as an example). The wiring interface device 2451 identifies the FSK signals as the caller identification signals between two ringing signals, and then modulates the signal voltage for sending to the FSK device 2452. The FSK device then modulates the signals into digital signals which are then outputted to the digital decoder 2453 which converts the digital signals into the LED display screen 25 required format. The converted signals are then outputted to the driver 242 and the controller 244 for processing and for displaying the caller identification data on the LED display screen 25.

Figure 9:
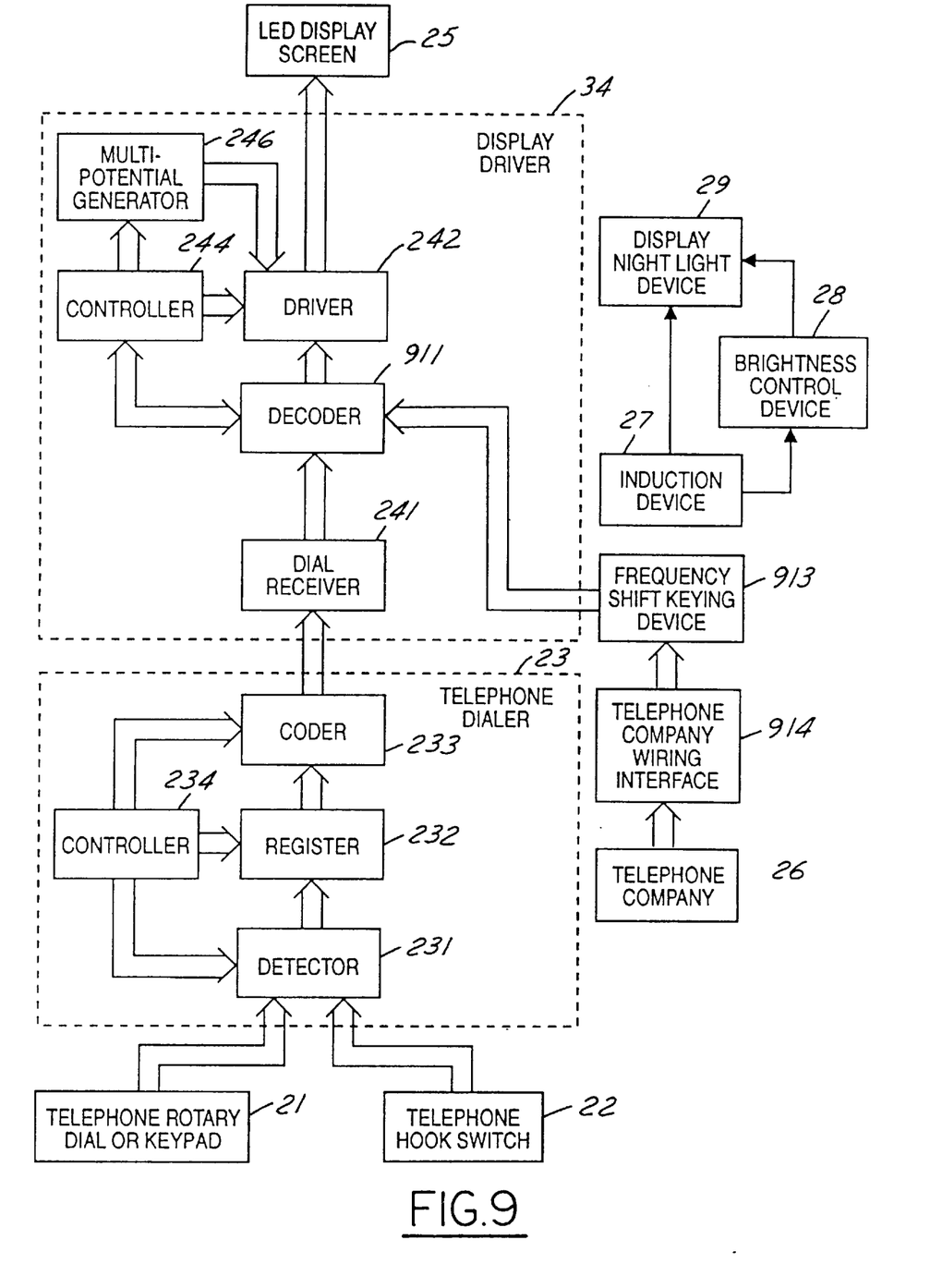
FIG. 9 is a structural diagram of the third alternate embodiment of the present invention device.

The digital decoder can be combined into the first decoder, since both units process digital signals. FIG. 9 shows a structural diagram of the third alternate embodiment. When a caller places a call, the telephone company wiring 26 transmits FSK signals that represent the caller identification data. The wire interface device 914 identifies the FSK signals as the caller identification signals between two ringing signals, and modulates the signal voltage for sending to the FSK device 913. The FSK device 913 then modulates the signals into digital signals which are then outputted to the decoder 911 which converts the digital signals into the LED display screen 25 required format. The converted signals are then outputted to the driver 242 and the controller 244 for processing. The caller identification data is subsequently displayed on the LED display screen 25.

Figure 3:
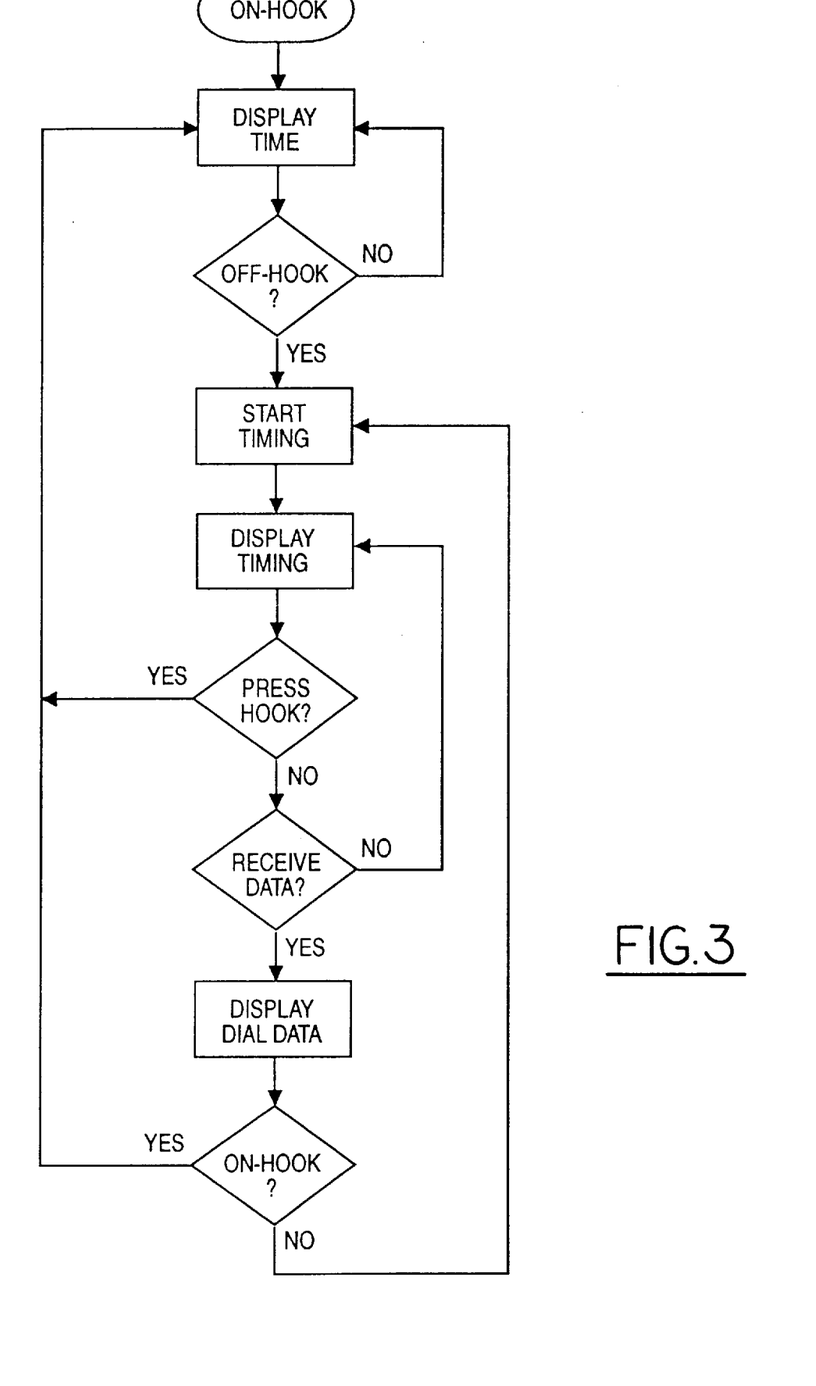
FIG. 3 is a flow diagram of the preferred embodiment shown in FIG. 2.

The flow diagram of the above embodiment of the multi-function telephone dialer display device is shown in FIG. 3. When considered together with FIG. 2 and the following descriptions, a better understanding can be obtained. The detector 231 receives signals from the telephone rotary/keypad 21 or hook switch 22:

(a) When the telephone is on-hook (hook switch signal is at a high potential), the detector 231 sends a signal to the controller 234. The controller 234 controls the coder 233 and sends a code to the dial receiver 241 (a buffer) which subsequently sends a code to decoder 242. After decoding, the controller 244 outputs a control signal which causes the driver 243 to drive LED display screen 25 and to display the time.

(b) When the telephone is picked up (the hook switch signal is at a low potential) and not dialed (i.e. when answering the phone), the detector 231 sends a signal to the controller 234. The controller 234 controls the coder 233 and sends a code to the dial receiver 241 (a buffer) which then sends a signal to the decoder 242. After decoding, the controller 244 starts calculating its usage time and outputs a control signal which causes the driver 243 to drive the LED display screen 25 and to display the usage time.

(c) When the telephone is picked up (the hook switch signal is at a low potential) and dialing is started, the detector 231 sends a signal to the controller 234. The controller 234 controls the coder 233 to code from the temporarily stored user input numbers in the register 232 and to send the output to the dial receiver 241 which then sends it to the decoder 242. After decoding, the controller 244 starts calculating its usage time and outputs a control signal which causes the driver 243 to drive the LED display screen 25 and to display the inputted telephone number. In addition, when the user is no longer inputting any data after 10 seconds, the controller controls the driver 243 to drive LED display screen 25 to switch to a display of usage time.

Figure 4:
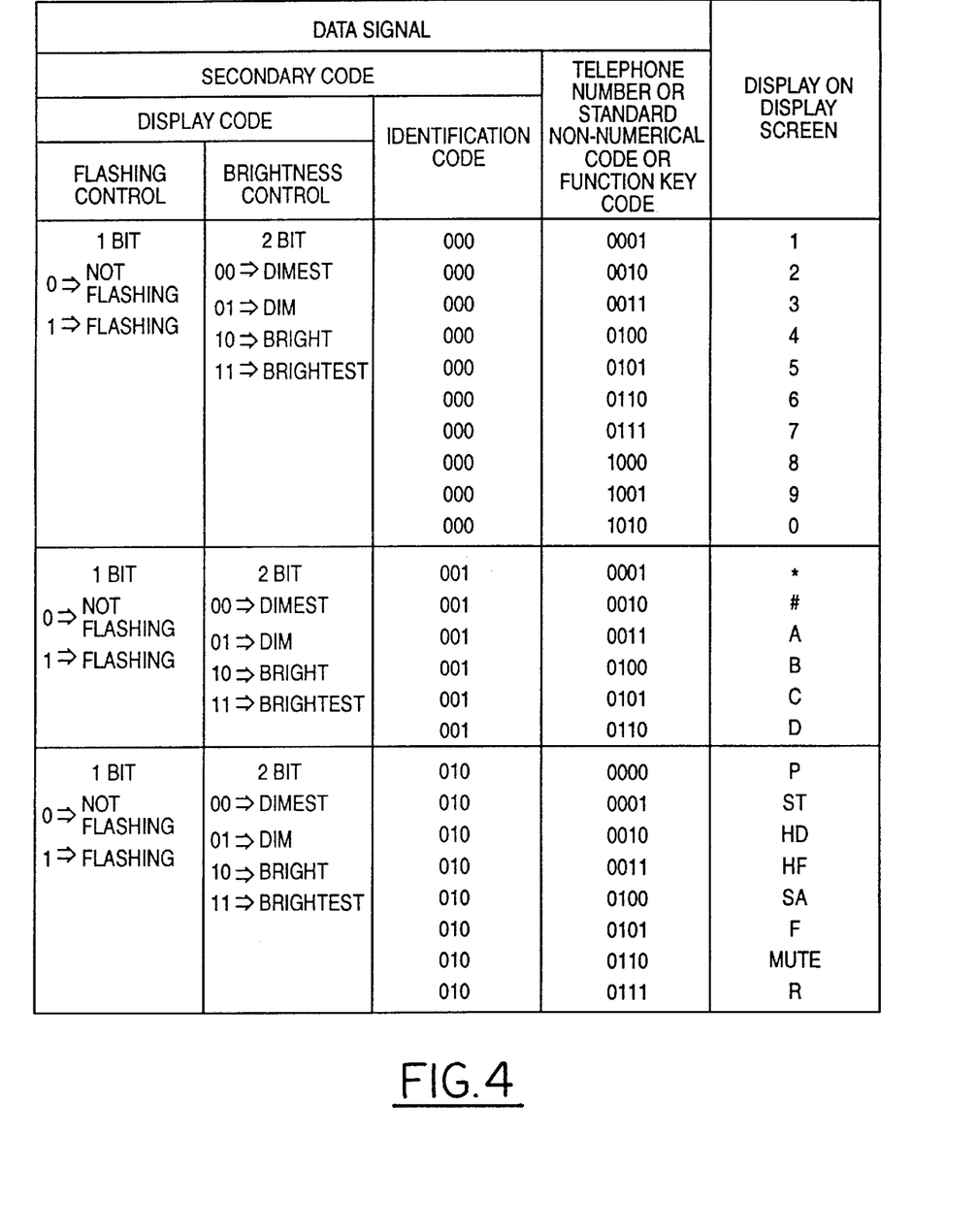
FIG. 4 is an example of a data signal coding table of the present invention multi-function telephone dialer display device.

The data signal coding procedure can be accomplished, as an example, by the coding table shown in FIG. 4. In FIG. 4, the example uses a 4-bit telephone number or a function key code of which a 6-bit secondary code (a combination of a 3-bit identification code and a 3-bit display code) is added to the front. By first defining the identification code 000 to be the numerical code (i.e. the telephone number), the identification code 001 to be the standard non-numerical code (i.e. the #, *, A, B, C, D, etc. on the dial which are non-numerical dial signals but can be accepted by the telephone company). In this example, the rules of CCITT Q.23 are followed, and the identification code 010 is the special function key code (as shown in FIG. 4: P: Pause, ST: Store, HD: Hold, HF: Hands Free, SA: Speed Access, F: Flash, M: Mute, R: Repeat, etc.). Next, decode the combined identification code, the numerical or standard non-numerical, or the function key code into different meanings and display them on the display screen or cause corresponding responses on the display screen. The identification code can be further defined for setting up functions. For example, 011 can be defined to be the symbol code, 100 to be the memory quick dial number, 111 to be the display screen status display code (For example, display clear or degree of brightness) etc. Although a 3-bit identification is used in this example, the identification code can be of different bit codes to expand its functions, based on the coding procedure requirements for the actual application condition and the amount of data. Furthermore, besides the identification code, the data signal, the 4-bit telephone or function key code can also be prefixed or postfixed with a display code to control the data status of the data signal which appears on the display screen. As shown in FIG. 4, a 1-bit controls the character flashing function and a 2-bit controls the brightness of the character. In addition, a prefix or postfix of the data signal can be inserted for necessary transmission code due to different transmission methods. For example, several bits of starting bits can be added before each block of data, while several bits of stopping bits can be added after each block of data.

Based on the fact that a LED display screen is luminescent, the problem of insufficient lighting in the environment can be avoided. However, in terms of the power consumption and screen resolution, the LED is still not satisfactory. As a consequence, the following alternate embodiment is provided.

Figure 5:
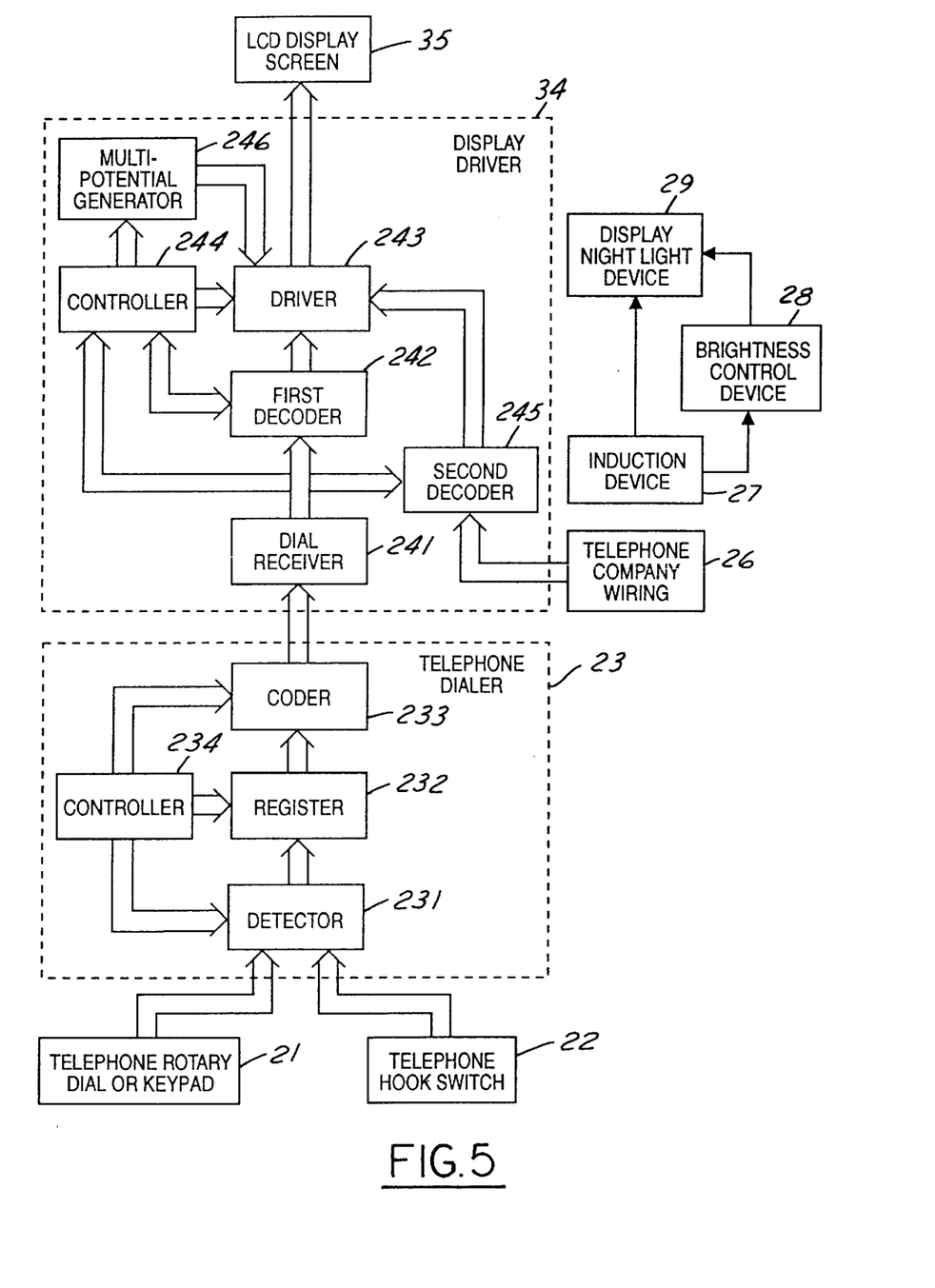
FIG. 5 is a block diagram of the first alternate embodiment of the present invention multi-function telephone dialer display device.

Referring now to FIG. 5, where a block diagram of the first alternate embodiment of the present invention is shown. The process flow diagram is similar to that of the preferred embodiment. However, a LCD screen 35 replaces the LED display screen 25 shown in FIG. 1. A multipotential generator 246 is also added between the driver 243 and the controller 244 in the display driver 34 in order to generate several to several tens of multi-potential signals in response to the controller 244. The signals are then provided to driver 243 after amplification to drive the LCD display screen 35. In addition, an induction device 27 and a display screen night light device 29 are also added. When the induction device 27 detects a luminous energy that is lower than a threshold value, it emit a signal to activate the display screen night light device 29 (such as a low power LED) and a brightness control device 28 to respond to the degree of brightness near the display device detected by the induction device 27. It controls the light intensity of the display night light device 29 and hence, provides lighting and solves the problem of insufficient light for users.

Figure 6:
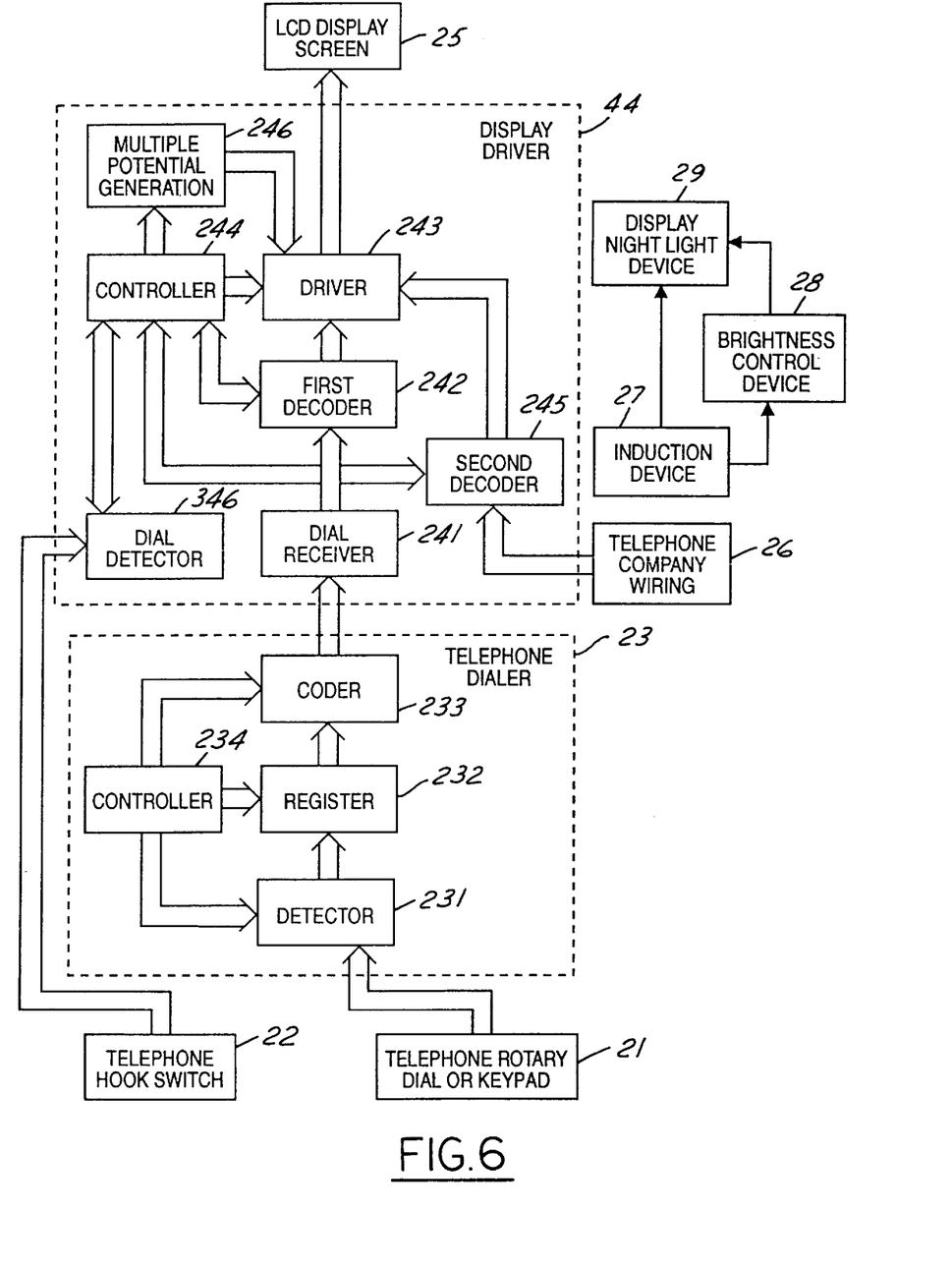
FIG. 6 is a block diagram of the second alternate embodiment of the present invention multi-function telephone dialer display device.

A second alternate embodiment of the present invention is shown in FIG. 6. The device, in general, is similar to the one shown in FIG. 5. However, the hook switch is directly connected to the dial detector 346 in the display driver 44. The hook related signals are directly received and detected by the dial detector 346 without going through dialer 23. The induction device 27, the display screen night light device 29 and the brightness control device 28 are also part of this multi-function telephone dialer display device.

In addition, if a delay device or a transmission converter is added between the dialer and the display driver in the multi-function telephone dialer display, the timing signal output from the dialer which is associated with the data signals can be used as the signals for the non-synchronous transmission.

The present invention device utilizes a novel integrated circuit structure to accomplish a display of caller identification data on a multi-function telephone dialer display. The device avoids the traditional high cost required for an external caller data display and furthermore, replaces a high cost CPU with a digital decoder for improving its effectiveness.

While the present invention has been described in an illustrative manner, it should be understood that the terminology used is intended to be in a nature of words of description rather than of limitation.

Furthermore, while the present invention has been described in terms of a preferred and several alternate embodiments, it is to be appreciated that those skilled in the art will readily apply these teachings to other possible variations of the inventions.

The embodiment of the invention in which an exclusive property or privilege is claimed are defined as follows:

We claim:

1. A multi-function telephone dialer display device comprising:
   a liquid crystal display (LCD) screen for displaying telephone operation status and caller identification data;
   a telephone dialer for responding to data input and generating signals to the display screen for displaying corresponding status;
   said dialer comprising a detector connected to a telephone rotary dial or a telephone keypad, a telephone hook switch for receiving and detecting input data of said rotary dial or telephone keypad, a register electrically connected to said detector for storing said input data, a coder to code said input data and to generate data signals, a controller electrically connected to said detector, and a register and a coder for responding to the input data detected by said detector and for controlling the operation of said register and coder;
   said dialer comprises an output pin to output a data signal and its associated timing signal, said data signal is coded into a numerical code representing an original digit, a standard non numerical code representing original non-numerical keys, or a function key code representing the function when dialing with numerical keys, with standard non-numerical keys, or when setting up functions, respectively; and
   a display driver comprises a dial receiver for receiving data signals from said telephone dialer, a decoder for receiving data signals from said dial receiver and a caller identification signal transmitted through telephone company wiring and converting to the required format for a liquid crystal display, a multi-potential generator for generating various electrical potentials of different sizes and polarities for said liquid crystal display, and a driver electrically connected to said decoder and said multi-potential generator for combining the output of a first and a second decoder and said multi potential generator and for generating signals to drive said liquid crystal display;
   said display driver electrically connected to said display screen, said telephone dialer and a caller data signal line for receiving and processing said data signal, said timing signal and a caller identification signal representing the caller information sent from the caller data signal line, and transferring the result of processing to said display screen for displaying a corresponding use status and a caller identification information.

2. A device according to claim 1, wherein said display driver further comprises a controller electrically connected to said first and said second decoder, said multi-potential generator and said driver for controlling the operation of said display driver.

3. A device according to claim 1, wherein said caller identification signal is a frequency shift keying (FSK) signal modulated by a frequency shift keying method.

4. A device according to claim 3, wherein said decoder comprises:
   a first decoder for receiving data signals from said dial receiver and converting them into a display screen required format; and
   a second decoder for receiving said frequency shift keying signals representing a caller information transmitted through said telephone company wiring and converting into a display screen required format.

5. A device according to claim 4, wherein said second decoder composes:
   a frequency shift keying device electrically connected to said telephone company wiring for obtaining a digital signal through frequency shift keying; and
   a digital decoder unit electrically connected to said frequency shift keying device for decoding said digital signal into said required display screen format.

6. A device according to claim 5, wherein said second decoder further comprises a wiring interface device electrically connected to said telephone company wiring and said frequency shift keying device for modulating said electric potential, for sizing an alternating current signal, and for filtering out noises and other unwanted signals such that the signals are within a working range of said frequency shift keying device.

7. A device according to claim 1, wherein said caller identification signal transmitted through a signal line and inputted to said decoder is a digital frequency shift keying signal representing said caller identification transmitted through the telephone company wiring wherein said electrical potential, a size of alternating current signal are modulated and noises and other unwanted signals are filtered out by a wiring interface device before inputting to said frequency shift keying device.

8. A multi-function telephone dialer display device comprising:

a liquid crystal display (LCD) screen for displaying telephone operation status and caller identification data;

a telephone dialer for responding to data input and generating signals to the display screen for displaying corresponding status;

said dialer comprises an output pin to output a data signal and its associated timing signal, said data signal is coded into a numerical code representing an original digit, a standard non numerical code representing original non-numerical keys, or a function key code representing the function when dialing with numerical keys, with standard non-numerical keys, or when setting up functions, respectively, a detector connected to a telephone rotary dial or a telephone keypad; a telephone hook switch for receiving and detecting input data of said rotary dial or telephone keypad; a register electrically connected to said detector for storing said input data; and a coder to code said input data and to generate said data signals; a controller electrically connected to said detector, said register and said coder for responding to the input data detected by said detector and for controlling the operation of said register and coder;

an induction device for detecting the degree of brightness near said display;

a display night light device electrically connected to said induction device for emitting light based on the degree of brightness near said display detected by said induction device for achieving desirable lighting effect;

a brightness control device, electrically connected to said induction device and said display night light device for controlling the brightness of the display night light device based on the degree of brightness near said display detected by said induction device; and a display driver electrically connected to said display screen, said telephone dialer and a caller data signal line for receiving and processing said data signal, said timing signal and said caller identification signal representing the caller information sent from the caller data signal line, and transferring the result of processing to said display screen for displaying a corresponding use status and a caller identification information;

said display driver further comprising a dial receiver for receiving data signals from said telephone dialer.

9. A device according to claim 8, wherein said display driver further comprises:

a dial receiver for receiving data signals from said telephone dialer;

a decoder for receiving data signals from said dial receiver and a caller identification signal transmitted through telephone company wiring and converting to the required format for the display screen; and a driver electrically connected to said decoder for combining the output of a first and a second decoder, and for generating signals to drive a light emitting diode display screen.

10. A device according to claim 9, wherein said display driver further comprises a controller electrically connected to said first decoder, said second decoder and said driver for controlling the operation of a driver.

11. A multi-function telephone dialer display device comprising:

a liquid crystal display (LCD) screen for displaying telephone operation status and caller identification data;

a telephone dialer for responding to data input and generating signals to the display screen for displaying corresponding status; said dialer comprises an output pin to output a data signal and its associated timing signal, said data signal is coded into a numerical code representing an original digit, a standard non numerical code representing original non-numerical keys, or a function key code representing the function when dialing with numerical keys, with standard non-numerical keys, or when setting up functions, respectively, a detector connected to a telephone rotary dial or telephone keypad for receiving and detecting input data of said rotary dial or said telephone keypad; a register electrically connected to said detector for storing said input data; a coder for coding said input data and for generating said data signals; a controller electrically connected to said detector, said register and said coder for responding to an input data detected by said detector and for controlling the operation of said register and said coder;

a display driver comprises a dial receiver for receiving data signals from said telephone dialer, a decoder for receiving data signals from said dial receiver and a caller identification signal transmitted through telephone company wiring and converting to the required format for the liquid crystal display, a dial detector for receiving data signals from a telephone hook switch, a multi potential generator for generating various electrical potentials of different sizes and polarities for said liquid crystal display, a driver electrically connected to a first and a second decoder and said multi-potential generator for combining the output of a decoder and said multi-potential generator and for generating the signals to drive said liquid crystal display, a controller electrically connected to said first and said second decoder, said multi-potential generator and said driver for controlling the operation of a driver; and said display driver electrically connected to said display screen, said telephone dialer and a caller data signal line for receiving and processing said data signal, said timing signal and a caller identification signal representing the caller information sent from the caller data signal line, and transferring the result of processing to said display screen for displaying a corresponding use status and a caller identification information.

12. A device according to claim 11 further comprising:

an induction device for detecting the degree of brightness near said display;

a display night device electrically connected to said induction device for emitting light based on the degree of brightness near said display detected by said induction device for achieving a desirable lighting effect; and a brightness control device electrically connected to said induction device and said display night light device for controlling the brightness of said display night light device based on the degree of brightness near said display detected by said induction device.

* * * * *